(12) United States Patent
Shinozaki

(10) Patent No.: US 9,703,475 B2
(45) Date of Patent: Jul. 11, 2017

(54) INPUT APPARATUS

(75) Inventor: Takayuki Shinozaki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 569 days.

(21) Appl. No.: 13/392,872

(22) PCT Filed: Aug. 26, 2010

(86) PCT No.: PCT/JP2010/005281
§ 371 (c)(1),
(2), (4) Date: Feb. 27, 2012

(87) PCT Pub. No.: WO2011/024465
PCT Pub. Date: Mar. 3, 2011

(65) Prior Publication Data
US 2012/0154329 A1 Jun. 21, 2012

(30) Foreign Application Priority Data
Aug. 27, 2009 (JP) .................. 2009-197070

(51) Int. Cl.
G06F 3/045 (2006.01)
G06F 3/041 (2006.01)
G06F 3/0488 (2013.01)
G06F 3/01 (2006.01)

(52) U.S. Cl.
CPC .......... *G06F 3/04886* (2013.01); *G06F 3/016* (2013.01); *G06F 2203/04105* (2013.01)

(58) Field of Classification Search
CPC .. G06F 3/04883; G06F 3/0488; G06F 3/0416; G06F 3/044
See application file for complete search history.

(56) References Cited

U.S. PATENT DOCUMENTS

2003/0122779 A1 7/2003 Martin et al.
2006/0132456 A1* 6/2006 Anson ..................... 345/173
(Continued)

FOREIGN PATENT DOCUMENTS

CN 1582465 A 2/2005
CN 101373414 A 2/2009
(Continued)

OTHER PUBLICATIONS

A. Toyoda; Office Action; Japanese Patent Application No. 2009-197070; Jul. 20, 2010.
(Continued)

*Primary Examiner* — Alexander Eisen
*Assistant Examiner* — Nan-Ying Yang
(74) *Attorney, Agent, or Firm* — Studebaker & Brackett PC

(57) ABSTRACT

An input apparatus capable of informing an operator of an execution state of a motion, executed based on pressing of keys and buttons after a predetermined period, through the keys and buttons pressed is provided.
An input apparatus 1 has a touch sensor 11 configured to detect a contact, a load detection unit 12 configured to detect a pressure load on a touch face of the touch sensor 11, a tactile sensation providing unit 13 configured to vibrate the touch face, and a control unit 15 configured to control the tactile sensation providing unit 13 when the pressure load detected by the load detection unit 12 continuously satisfies a predetermined standard for a predetermined period such that a tactile sensation is provided to an object pressing the touch face.

2 Claims, 11 Drawing Sheets

(56) References Cited

U.S. PATENT DOCUMENTS

| | | | | |
|---|---|---|---|---|
| 2006/0146032 A1* | 7/2006 | Kajimoto | ........... | G01C 21/3652 345/173 |
| 2007/0024595 A1* | 2/2007 | Baker | ................ | G06F 3/03547 345/173 |
| 2007/0229455 A1 | 10/2007 | Martin et al. | | |
| 2009/0051667 A1* | 2/2009 | Park et al. | .................... | 345/173 |
| 2010/0128002 A1* | 5/2010 | Stacy et al. | .................... | 345/174 |
| 2011/0102340 A1 | 5/2011 | Martin et al. | | |
| 2011/0279381 A1* | 11/2011 | Tong et al. | .................... | 345/173 |
| 2013/0027324 A1 | 1/2013 | Martin et al. | | |

FOREIGN PATENT DOCUMENTS

| | | | | | |
|---|---|---|---|---|---|
| JP | | 11212725 A | * | 8/1999 | ............ G06F 3/033 |
| JP | | 2003-058041 A | | 2/2003 | |
| JP | | 2004-071233 A | | 3/2004 | |
| JP | | 2005-173966 A | | 6/2005 | |
| JP | | 2005-332063 A | | 12/2005 | |
| JP | | 2007-133698 A | | 5/2007 | |
| WO | | 2009/022657 A1 | | 2/2009 | |

OTHER PUBLICATIONS

International Search Report; PCT/JP2010/005281; Nov. 22, 2010.
Japanese Office Action "Notification of Reason for Refusal" dated of Aug. 21, 2012; Japanese Patent Application No. 2010-241417; with translation.
Japanese Office Action "Official Decision of Rejection" dated Dec. 11, 2012, which corresponds to Japanese Patent Application No. 2010-241417 and is related to U.S. Appl. No. 13/392,872 with translation.
Japanese Office Action "Notification of Reason for Refusal" dated Oct. 16, 2012, which corresponds to Japanese Patent Application No. 2010-241417 and is related to U.S. Appl. No. 13/392,872 with translation.
Y. Morikawa; Japanese Office Action "Notification of Reason for Refusal" with translation; Japanese Patent Application No. 2009-197070; drafted date Feb. 25, 2010.
A. Toyoda; Japanese Office Action "Official Decision of Refusal" with translation; Japanese Patent Application No. 2009-197070; drafted date Jul. 20, 2010.
S.Mizuno; Japanese Office Action "Interrogation" with translation; Japanese Patent Application No. 2009-197070; Aug. 23, 2011.
Japanese Office Action "Appeal Decision of Refusal" with translation; Japanese Patent Application No. 2009-197070; Dec. 6, 2011.
"Notification of the First Office Action," issued by the State Intellectual Property Office on China on Jan. 17, 2014, which corresponds to Chinese Patent Application No. 201080038136.1 and is related to U.S. Appl. No. 13/392,872; with English language translation.
An Office Action; "Decision," issued by the Japanese Patent Office on Feb. 25, 2014, which corresponds to Japanese Patent Application No. 2010-241417 and is related to U.S. Appl. No. 13/392,872; with English language concise explanation.

* cited by examiner

FIG. 2
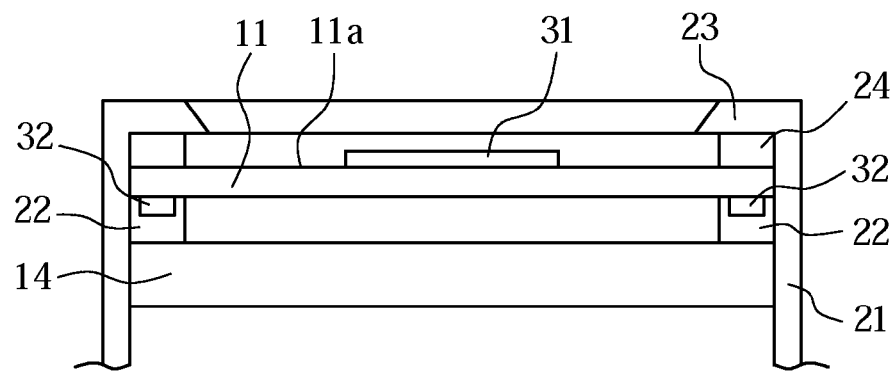
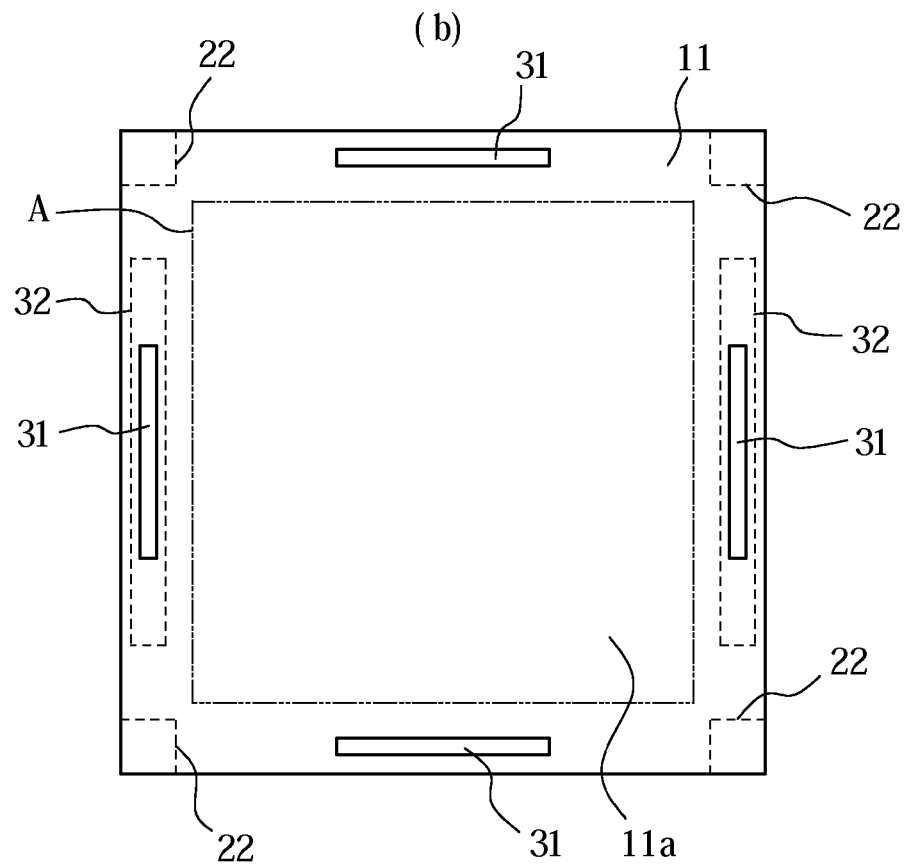

FIG. 4
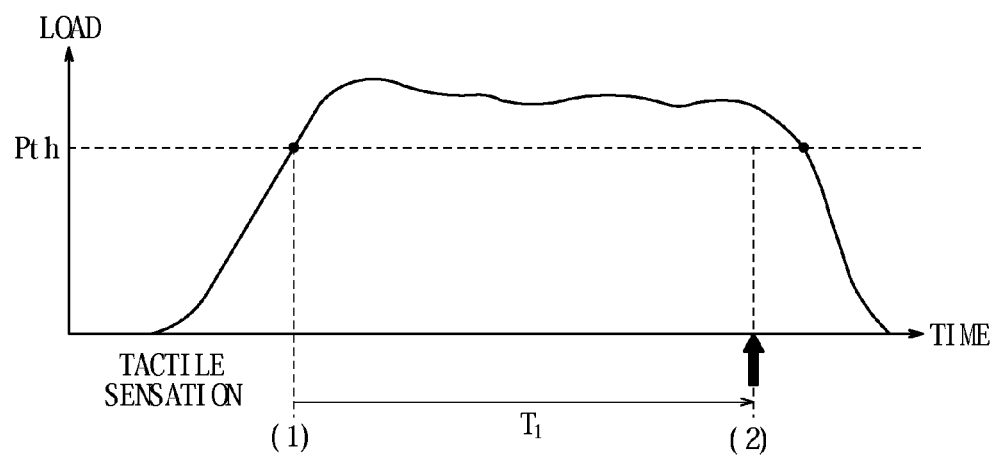
(A)
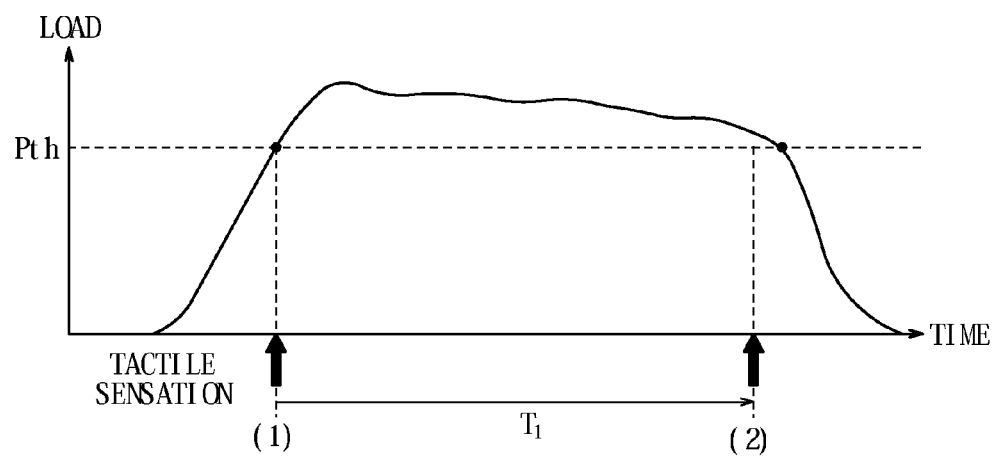
(B)

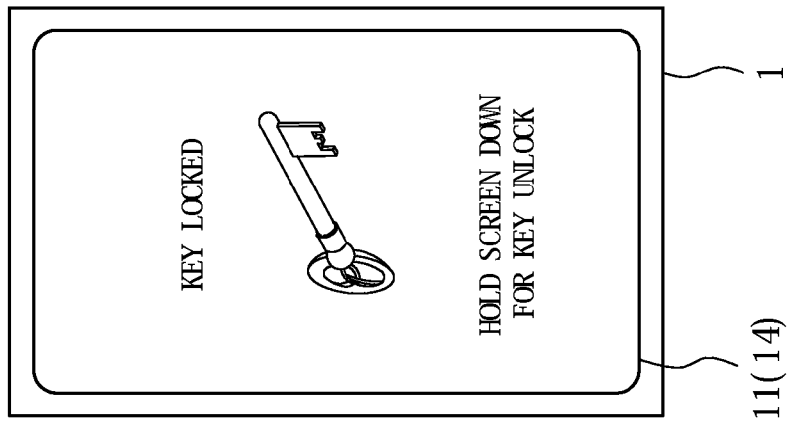
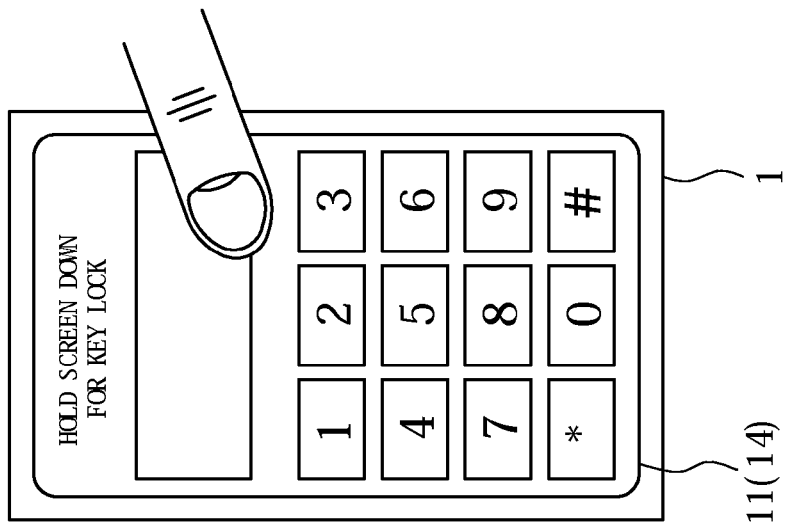
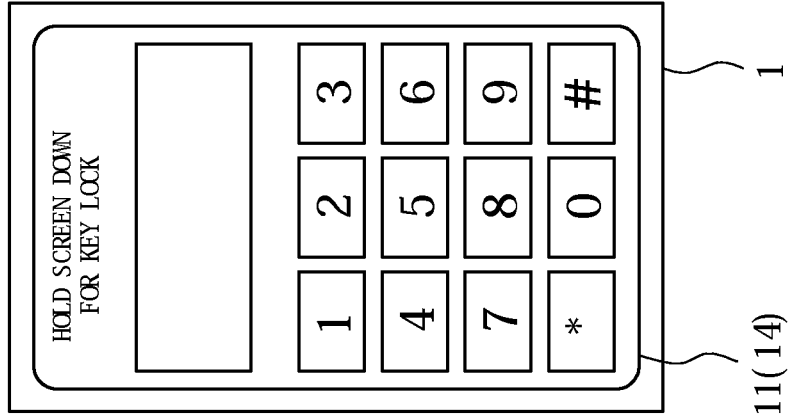
FIG. 5

INPUT APPARATUS

CROSS REFERENCE TO RELATED APPLICATION

This application claims priority to and the benefit of Japanese Patent Application No. 2009-197070 filed on Aug. 27, 2009, the entire contents of which are incorporated herein by reference.

TECHNICAL FIELD

The present invention relates to an input apparatus having a touch sensor.

BACKGROUND ART

In operation of keys and buttons of the input apparatus constituted of mechanical switches, an operator can receive a feedback by actually feeling depression of the keys and the buttons. That is, when the operator presses down the keys and buttons (hereinafter, referred to as "keys and the like"), the operator can obtain a button depression sensation allowing for a perception that the operator "has pressed down" the keys and the like. Such a sensation obtained when pressing down the keys and the like has a variety of types in accordance with various elements, such as shapes and strokes of the keys and the like as well as configurations of the mechanical switches constituting the keys and the like.

When a pressing operation of the keys and the like of the input apparatus is performed, a terminal having the input apparatus, as triggered by the operation, generally initiates a predetermined operation at once. For example, upon operation to input a character from a keyboard by the operator, a character input apparatus instantly displays the character input based on the operation. In addition, when a switch configured to activate a machine to perform a predetermined motion is turned on, the machine initiates the motion immediately. Accordingly, there is another aspect in such operations: the operator uses obtainment of a key depression sensation in operation as a sign that such the pressing operation is detected and the predetermined motion is performed. That is, it is considered that the operator expects initiation of the predetermined motion when obtaining the pressing sensation of the keys and the like.

However, it is not always when receiving an operation for the terminal having the input apparatus to initiate the predetermined motion. For example, when the character input apparatus executes an auto repeat function, a first character is displayed immediately when the operator presses down a predetermined character key. Then, if the operator keeps pressing the same key, the same character is continuously displayed one after another. Such an "auto repeat" is also referred to as a key repeat and represents a function to continuously input not only one but a plurality of the same corresponding characters when the same key is continuously pressed down. In addition, for example, a key lock/unlock function to switch between enabling/disabling an operation of the key and the like of the input apparatus is usually configured to lock when a predetermined key and the like is held down, in order to prevent locking by erroneous operations. It is to be noted that to "hold down" is an operation to keep pressing the same key down for a predetermined period.

If a motion based on an operation is executed after detection of the operation as described above, the input apparatus having the keys and the like constituted of the mechanical switches cannot inform the operator of initiation of the motion through the key and the like. That is, after the operator presses down the key and the like constituted of the mechanical switches, the input apparatus cannot provide a tactile sensation to the operator through the key and the like, by any motion based on application software and the like. In such a case, the operator cannot confirm, through the keys and the like being pressed, that a first operation by the operator is appropriately detected and a following motion is correctly executed based on the first operation.

Therefore, if a motion is executed after holding down the predetermined keys and the like for such as key lock described above, the operator cannot feel execution of the motion. The same is true when, such as in auto repeat, a predetermined motion is continuously executed as long as the key and the like are continuously pressed down. In such a case, as incapable of confirming that the operation by the operator is correctly detected, the operator may take trouble in carrying out the same operation again to make sure that the operation is correctly detected. In addition, since the operator cannot assess execution of the motion after detection of the operation by the operator, it may induce erroneous operations, as the operator cannot know timing to cancel a state pressing down the key and the like.

Accordingly, if the motion is executed after the first operation by the operator based thereon, it is desirable that the input apparatus informs the operator of an execution state of the motion in some manners. Under usual circumstances, progress of the motion based on the operation by the operator after the operation can be recognized by viewing a variety of display states such as characters and the like displayed on the display unit (display panel) of the input apparatus.

Under some circumstances, however, the operator cannot operate looking at the display unit the whole time. For example, a small terminal such as a mobile phone is designed to have a small body, the display unit to display a result of the input operation is often small, making it difficult to visually recognize the result. In addition, since the terminal such as the mobile phone has a characteristic allowing mobility, it is often the case that the operator operates the input apparatus while doing something else, without looking at the display unit. In consideration of such conditions, it is desirable to inform the operator of that the execution state of the motion by means other than the display on the display unit.

Moreover, it is difficult for people with weak sight and visually impaired people to correctly perform the input operation by looking at the display unit. Further, for example, if the input apparatus and the display unit to display the result of the operation are installed away from each other, the operator cannot visually confirm whether the operation by the operator is correctly detected. Therefore, it is advantageous to be able to let the operator recognize the progress of the motion based on the operation by the operator after the operation, in a manner different from visual recognition.

As a method to inform the operator of progress of the motion based on the input operation by the operator after the operation, there is suggested a method to inform the operator of the result of the input operation by generating a sound (for example, see Patent Document 1).

The computer disclosed in Patent Document 1 can inform the operator of that the auto repeat function is activated based on holding down of the key of the keyboard, by means of a display or the sound. Adoption of such a technique allows the operator to recognize progress of the motion based on the operation by the operator after the operation, even under circumstances where the display of the display unit (display panel) cannot be visually observed.

RELATED ART DOCUMENT

Patent Document

Patent Document 1: Japanese Patent Laid-Open No. 2003-58041

SUMMARY OF INVENTION

Technical Problem

However, such a method to inform by the sound cannot be always recognized by the operator, either. For example, when the input apparatus is used in a noisy place or when the operator is hearing impaired, it is difficult for the operator to recognize the sound informing about progress of execution of the motion based on the operation by the operator after the operation. In some public places, moreover, since it is inappropriate to make a sound, it is undesirable to use the input apparatus which informs by generating the sound as described above.

Accordingly, an object of the present invention in consideration of such conditions is to provide the input apparatus capable of informing the operator of progress of execution of the motion initiated based on pressing down of the keys and buttons after a predetermined period through the keys and buttons pressed.

Solution to Problem

In order to achieve the above object, an input apparatus according to a first aspect of the present invention includes:
a touch sensor configured to detect a contact;
a load detection unit configured to detect a pressure load on a touch face of the touch sensor;
a tactile sensation providing unit configured to vibrate the touch face; and
a control unit configured to control drive of the tactile sensation providing unit, when the load detection unit detects a pressure load continuously satisfying a predetermined standard for a predetermined period, such that a tactile sensation is provided to an object pressing the touch face.

A second aspect of the present invention is the input apparatus according to the first aspect, wherein
the control unit controls the tactile sensation providing unit, while the pressure load continuously satisfies the predetermined standard, such that the tactile sensation is repeatedly provided to the object pressing the touch face.

A third aspect of the present invention is the input apparatus according to the second aspect, wherein
the control unit controls the tactile sensation providing unit, when an original operation is executed again after one cycle of a cyclic repetitive operation while the pressure load continuously satisfies the predetermined standard, such that a tactile sensation different from the tactile sensation repeatedly provided is provided to the object pressing the touch face.

Effect of the Invention

According to the present invention, when the pressure load on the touch face of the input apparatus continuously satisfies the predetermined standard for the predetermined period, the tactile sensation providing unit provides the tactile sensation to the object pressing the touch face. Accordingly, it is possible to inform the operator of an execution state of a motion initiated after the predetermined period based on pressing of keys and buttons, through the keys and buttons pressed. Therefore, even under circumstances where, for example, a display unit of the input apparatus cannot be visually observed, it is possible for the operator to know whether an operation by the operator is correctly detected by the input apparatus. In addition, it is also possible for the operator to know, together with the execution state, whether the input apparatus is correctly executing the motion based on the operation.

BRIEF DESCRIPTION OF DRAWINGS

FIG. 2 illustrates an exemplary implementation structure of the input apparatus according to the first embodiment;
FIG. 4 illustrates graphs of an exemplary chronological change of a pressure load detected by a load detection unit according to the first embodiment;
FIG. 5 illustrates an operation of the input apparatus according to the first embodiment.

DESCRIPTION OF EMBODIMENTS

Embodiments of the present invention will be described with reference to the accompanying drawings.

(First Embodiment)

Figure 1:
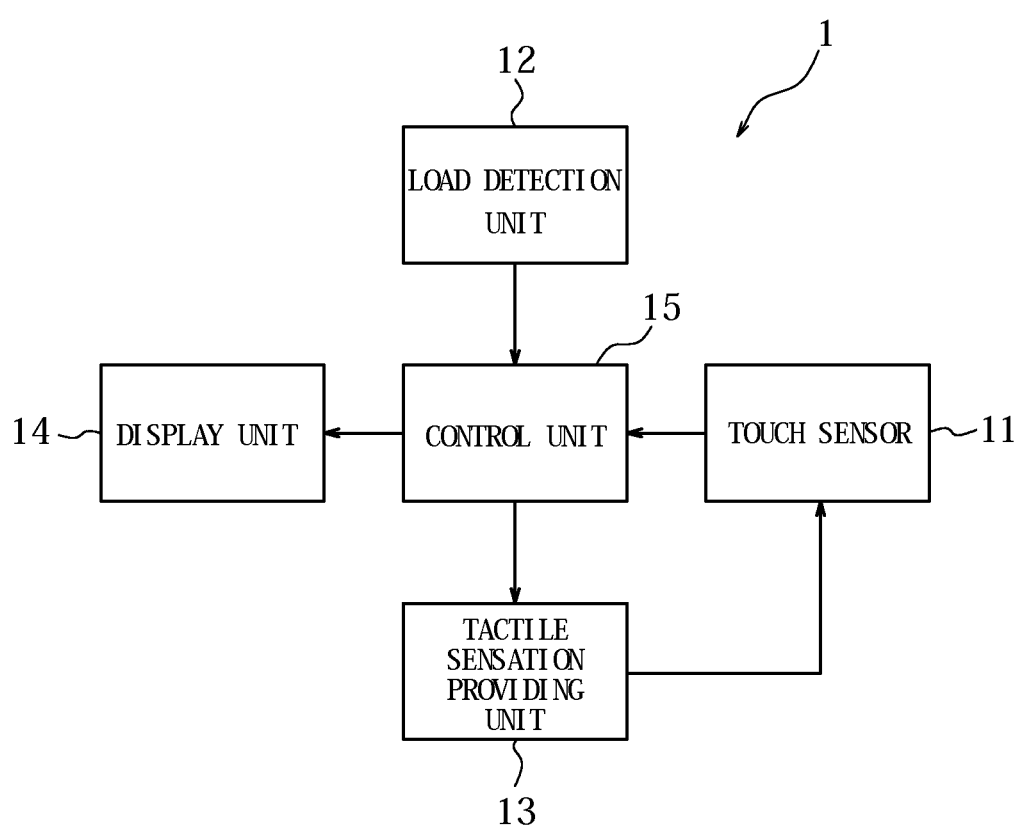
FIG. 1 is a block diagram illustrating a schematic constitution of an input apparatus according to a first embodiment of the present invention.

FIG. 1 is a block diagram illustrating a schematic constitution of an input apparatus according to a first embodiment of the present invention.

As illustrated in FIG. 1, an input apparatus 1 according to the first embodiment has a touch sensor 11, a load detection unit 12, a tactile sensation providing unit 13, a display unit 14, and a control unit 11 configured to control overall operations.

The touch sensor 11 is usually disposed on a front face of the display unit 14 such that a touch face of the touch sensor 11 detects a pressing input (contact) to keys and buttons displayed on the display unit 14 by an operator's finger or the like. The touch sensor 11 may include, for example, a known type such as a resistive film type, a capacitive type, an optical type or the like. The load detection unit 12 detects a pressure load applied to the touch face of the touch sensor 11 and may include an element such as, for example, a strain gauge sensor, a piezoelectric element or the like, which linearly reacts to the load. The tactile sensation providing unit 13 vibrates the touch sensor 11 and may include, for example, a piezoelectric vibrator. The display unit 14 displays an input object of the key such as a push-button switch (push-type button switch) and may include, for example, a liquid crystal display panel, an organic EL display panel or the like.

FIG. 2 illustrates an exemplary implementation structure of the input apparatus 1 illustrated in FIG. 1; FIG. 2(a) is a cross-sectional view of a main section, and FIG. 2(b) is a plane view of the main section. The display unit 14 is contained in a housing 21. The touch sensor 11 is disposed on the display unit 14 via insulators 22 made of elastic members. In the input apparatus 1 according to the present embodiment, the display unit 14 and the touch sensor 11 are rectangular in shape in a planar view. Also, according to the present embodiment, the touch sensor 11 is held on the display unit 14 via the insulators 22 arranged at four corners outside a display area A of the display unit 14 illustrated by a chain double-dashed line in FIG. 2(b).

The housing 21 is provided with an upper cover 23 covering a surface area of the touch sensor 11 outside the display area of the display unit 14. An insulator 24 made of elastic member is arranged between the upper cover 23 and the touch sensor 11.

The touch sensor 11 illustrated in FIG. 2 may have, for example, a surface member having a touch face 11a and constituted of a transparent film or the glass, and a rear face member constituted of the glass or acryl. The touch sensor 11 is designed such that, when the touch face 11a is pressed down, a pushed part is bent (strained) slightly relative to the pressing force or a structure itself is bent slightly.

A strain gauge sensor 31 to detect a load (pressuring force) applied on the touch sensor 11 is provided, adhered or the like, on a surface of the touch sensor 11 at a position close to each periphery to be covered by the upper cover 23. In addition, a piezoelectric vibrator 32 to vibrate the touch sensor 11 is provided, adhered or the like, on the rear face of the touch sensor 11 at a position close to a periphery on each of two opposing sides. That is, the input apparatus illustrated in FIG. 2 has the load detection unit 12 illustrated in FIG. 1 including four strain gauge sensors 31 and the tactile sensation providing unit 13 including two piezoelectric vibrators 32. In addition, the tactile sensation providing unit 13 vibrates the touch sensor 11 such that the touch face 11a is vibrated. It is to be noted that the housing 21, the upper cover 23 and the insulator 24 illustrated in FIG. 2(a) are omitted in FIG. 2(b).

Figure 3:
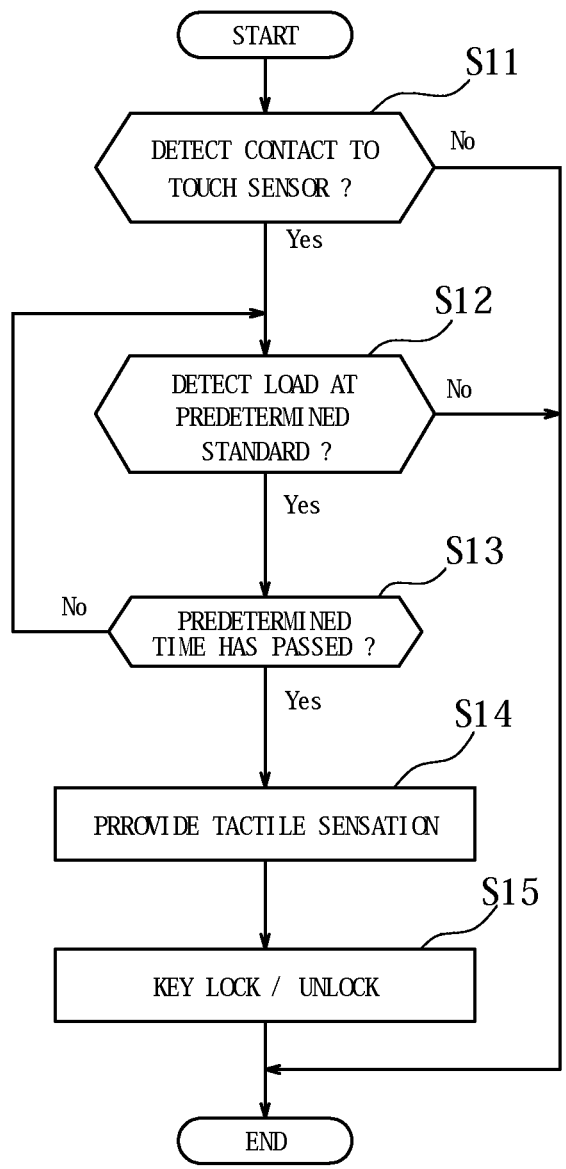
FIG. 3 is a flowchart illustrating operations by the input apparatus according to the first embodiment.

FIG. 3 is a flowchart illustrating operations of the input apparatus 1 according to the present embodiment. According to the input apparatus 1 of the present embodiment, a tactile sensation is not provided at a point when a contact to the touch sensor 11 is detected but is provided when the contact is maintained for a predetermined period, in order to indicate that a predetermined operation is initiated. In the flowchart illustrated in FIG. 3, the description assumes, as an application example of the present embodiment, a mobile terminal such as a mobile phone having a touch sensor such as a touch panel that executes a key lock function to switch between enabling/disabling a contact operation.

When an operation of the input apparatus according to the present embodiment is initiated, the control unit 15 monitors an input to the touch sensor 11 and a load detected by the load detection unit 12. At step S11, if it is detected that a contact to the touch sensor 11 by a pressing object (pressing means), such as the finger or a stylus pen, is made to a position corresponding to an input object displayed on the display unit 14, the control unit 15 proceeds to step S12. According to the present embodiment, the input object may be a graphic image depicting to an operator a position where a contact will be detected. In addition, if a contact is detected by the entire touch sensor 11 (any part of the touch sensor 11), the input object according to the present embodiment may be an entire panel including all images such as the keys and the like and a background picture displayed on the display unit 14.

At step S12, the control unit 15 determines whether the pressure load detected by the load detection unit 12 is increased according to a pressure on the touch sensor 11 and satisfies a predetermined standard. The load detection unit 12 detects the load from, for example, an average output value of the four strain gauge sensors 31. When the pressure load detected by the load detection unit 12 does not satisfy the predetermined standard, an operation according to the present embodiment is not executed even if the contact to the touch sensor 11 is detected at step S12. If the pressure load satisfying the predetermined standard is detected at step S12, the control unit 15 determines whether a predetermined time has passed (step S13). If the predetermined time has not passed at step S13, the control unit 15 returns to step S12 to determine whether the pressure load detected by the load detection unit 12 is continuously satisfying the predetermined standard. If the pressure load is continuously satisfying the standard load, the control unit proceeds to step S13. According to the present embodiment, the "predetermined period" may be, for example, a period corresponding to duration of "holding down" described above. In this case, the predetermined period is appropriately set to be, for example, two seconds.

At step S13, when the predetermined period expires while the pressure load detected by the load detection unit 12 continuously satisfies the predetermined standard, the control unit 15 proceeds to step S14. At step S14, the control unit 15 drives the tactile sensation providing unit 13 with a predetermined drive signal such that the touch sensor 11 is vibrated in a predetermined vibration pattern and provides a tactile sensation. That is, when the pressure load detected by the load detection unit 12 continuously satisfies the predetermined standard for the predetermined period, the control unit 15 controls the tactile sensation providing unit 13 such that the tactile sensation is provided to an object pressing the touch face of the touch sensor 11. The tactile sensation providing unit 13 drives, for example, two piezoelectric vibrators 32 in phase.

After providing the tactile sensation from the tactile sensation providing unit 13 at step S14, the control unit 15 executes the key lock function if it is not being executed, or cancels (unlocks) the key lock function if it is already being executed (step S15). When executing/canceling the key lock function, a display state or an object at a position (contact position) on the display unit 14, to which the pressing object (pressing means) has contacted, are changed by varying color or the like in order to indicate more clearly that the operation by the operator is correctly detected and processed.

FIG. 4 illustrates an exemplary state that the tactile sensation is provided after the input apparatus 1 according to the present embodiment detects the contact. In FIG. 4, with a vertical axis indicating the pressure load detected by the load detection unit 12 and a horizontal axis indicating the time, the graphs illustrate exemplary chronological change of the pressure load detected by the load detection unit 12 according to the present embodiment. In the graphs illustrated in FIG. 4, Pth represents the predetermined standard of the pressure load detected by the load detection unit 12. It is preferable that, based on the pressure load of a usual pressing operation by the operator, the Pth is preset to be, for example, 1 N (Newton) and resettable thereafter.

In the example illustrated in FIG. 4(A), the curved line in the graph starts at a point when the touch sensor 11 detects the contact and the load detection unit 12 detects the pressure load. As illustrated in FIG. 4(A), the control unit 15 initiates countdown of a predetermined time T1 at a point (1) when the pressure load detected by the load detection unit 12 increases according to the pressure on the touch sensor 11 and satisfies the predetermined standard Pth. According to the present embodiment, as illustrated in FIG. 4(A), the tactile sensation providing unit 13 does not provide the tactile sensation at the point (1) when the pressure load satisfies the standard load Pth, in order to indicate that the predetermined operation has not been initiated yet. Then, the control unit 15 maintains the countdown until it reaches the predetermined time T1.

Then, at a point (2) when the countdown reaches predetermined time T1 following the point (1) when the pressure load satisfies the predetermined standard Pth, the tactile sensation providing unit 13 provides the tactile sensation, in order to indicate that the predetermined operation, that is, key lock/unlock process is initiated. In FIG. 4(A), an upward pointing arrow illustrated at the point (2) indicates timing when the tactile sensation providing unit 13 vibrates the touch face of the touch sensor 11. Tactile sensation generated at this point allows the operator to recognize that the predetermined operation is correctly initiated at the point (2) based on the operation (carried out at the point (1) by the operator). FIG. 4(A) illustrates a state that the operator recognizes that the predetermined operation is correctly initiated at the point (2) and thus removes the finger or the like from the touch face of the touch sensor while reducing the pressure load.

FIG. 5 illustrates an example of an operation of the key lock function by the input apparatus 1 according to the present embodiment.

In FIG. 5(A), the input apparatus 1 displays an object such as a numerical keypad on the display unit 14, in order to detect a contact operation by the operator to the touch face of the touch sensor 11 corresponding to a position of the object. For example, in order to prevent an unintentional contact operation to the touch face of the touch sensor 11 while the input apparatus 1 is not in use for a while, a contact to the touch face of the input apparatus 1 is disabled (the key lock is activated). In order to disable a contact, the operator applies a pressure load equal to or over the predetermined standard to the touch face of the touch sensor 11 for the predetermined time or longer as illustrated in FIG. 5(B). Then, when the predetermined time has passed, the input apparatus 1 executes the key lock function as illustrated in FIG. 5(C) such that a contact operation to the touch face thereafter is disabled. At this time, the input apparatus 1 controls the tactile sensation providing unit 13 to provide the tactile sensation. Accordingly, it allows the operator to recognize that the key lock function is correctly initiated based on the contact operation holding down the touch face by the operator.

Figure 6:
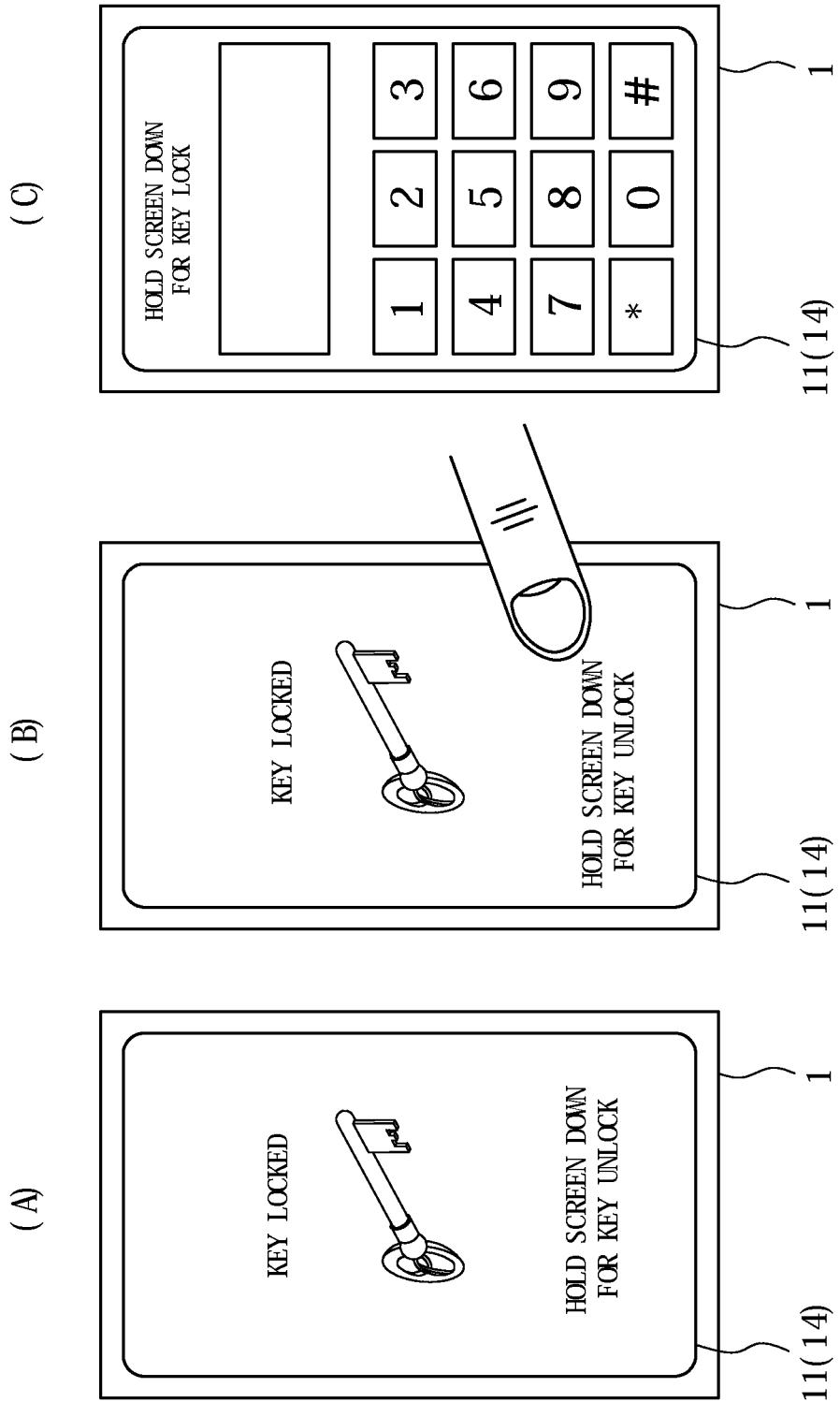
FIG. 6 illustrates an operation of the input apparatus according to the first embodiment.

FIG. 6 illustrates an example of an operation to cancel (unlock) the key lock function by the input apparatus 1 according to the present embodiment. The operation illustrated in FIG. 6 corresponds to an opposite operation of the key lock function described with reference to FIG. 5. Similarly to FIG. 5(C), FIG. 6(A) illustrates a state that the contact operation to the touch face is disabled as the key lock function is in execution. In order to once again enable the contact operation to the input apparatus 1 whose key lock function to disable the contact operation is in execution (in order to cancel the key lock or unlock), the operator applies a pressure load equal to or higher than the predetermined standard to the touch face of the touch sensor 11 for the predetermined time or longer as illustrated in FIG. 6(B). Then, when the predetermined time has passed, the key lock function is canceled as illustrated in FIG. 6(C) such that a contact operation to the touch face becomes effective thereafter. At this time also, the input apparatus 1 controls the tactile sensation providing unit 13 to provide the tactile sensation. Accordingly, it allows the operator to recognize that the key lock function is correctly canceled based on the contact operation holding down the touch face by the operator.

In the above description of the present embodiment, as illustrated in FIG. 4(A), at the point (1) when the pressure load satisfies the predetermined standard Pth, the tactile sensation providing unit 13 does not provide the tactile sensation, in order to indicate that the predetermined operation has not been initiate. However, as illustrated in FIG. 4(B), it is also possible to provide the tactile sensation at the point (1) when the pressure load satisfies the predetermined standard Pth, in order to indicate that a first contact operation to the key and the like is detected (that is, to indicate that the countdown of the predetermined time T1 is initiated). In such a case, the tactile sensation provided at the point (1) and that provided at the point (2) may be either the same or different from each other. When different tactile sensations are provided at the respective point (1) and (2), it is possible to provide a click sensation as a key depression sensation and the like at the point (1) and a tactile sensation, different from the click sensation and indicating that the key lock is executed, at the point (2).

In order to provide a realistic click sensation to the operator, the input apparatus 1 stimulus a tactile sensation of the operator while stimulating a pressure sensation as well, by the following operation. For example, the input apparatus 1 stimulates the pressure sensation until the pressure load applied to the touch sensor 11 satisfies the standard to provide the tactile sensation (for example, 1 N) and, when the pressure load satisfies the standard, stimulates the tactile sensation by driving the piezoelectric element 32 with the predetermined drive signal such that the touch face 11a is vibrated. Thereby, the input apparatus 1 can provide the operator with the click sensation similar to that obtained when pressing the button switch such as the push-button switch (push-type button switch). Accordingly, even with the push-button switch graphically depicted on the touch sensor, the operator can carry out the contact operation feeling the realistic click sensation similar to that obtained when operating the actual push-button switch. Therefore, the operator may not have the feeling of strangeness. Moreover, since the operator can carry out the input operation in conjunction with perception to "have tapped" the touch sensor 11, it prevents erroneous input caused by mere tapping.

The drive signal to provide the click sensation described above, that is, a certain frequency, the period (wavelength), the waveform and the vibration amplitude to stimulate the tactile sensation may be set appropriately according to the click sensation to be provided. For example, in order to provide the click sensation represented by a metal dome switch employed by the mobile terminal, the tactile sensation providing unit 13 is driven by a drive signal of, for example, a sine wave with a frequency of 170 Hz, for 1 period at the above point (1). The tactile sensation providing unit 13 is driven with the drive signal described above such that the touch face 11a is vibrated by approximately 15 μm under the standard pressure load Pth. Thereby, it is possible to provide the operator with the realistic click sensation similar to that obtained when pressing down an actual key.

According to the present embodiment, as described above, by carrying out the contact operation holding down the touch face of the touch sensor 11 of the input apparatus 1, the operator, through the touch face, can recognize whether the key lock/unlock function is correctly executed. According to the present embodiment, moreover, even if the load detection unit 12 detects a pressure load satisfying the predetermined standard load, the key lock/unlock function is not executed until the predetermined time passes while the pressure load is continuously detected. Therefore, it is possible to eliminate the disadvantage that the key lock is unintentionally canceled and an undesirable operation is performed, caused by, for example, something accidentally touching the touch face of the touch sensor 11 of the input apparatus 1 to apply a pressure load satisfying the predetermined standard load Pth.

(Second Embodiment)

Next, an input apparatus according to a second embodiment of the present invention will be described. An input apparatus 2 according to the second embodiment may have the same constitution as that of the input apparatus 1 described in the first embodiment but partially alters the operation according to the first embodiment. Hence, the same descriptions as those of the first embodiment will be appropriately omitted.

Figure 7:
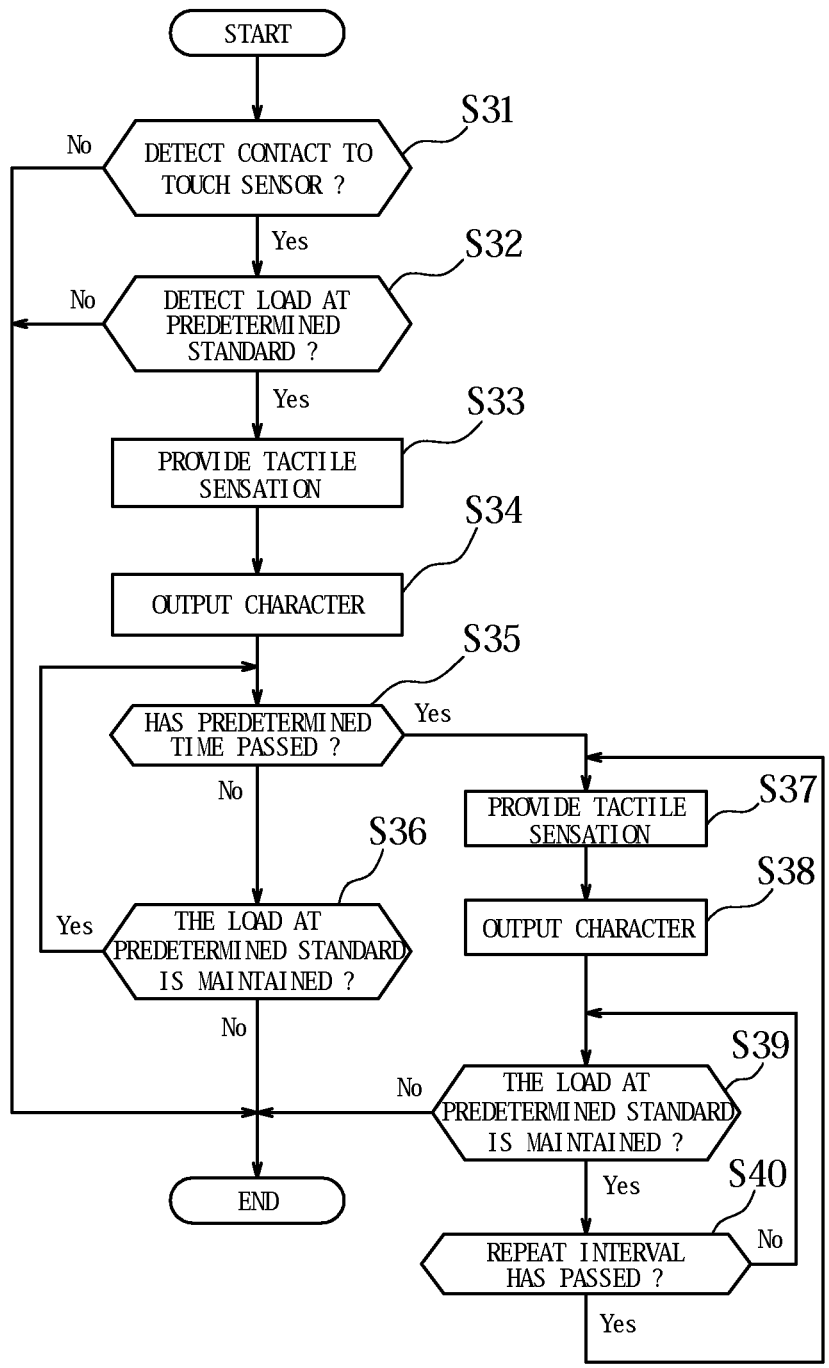
FIG. 7 is a flowchart illustrating operations by the input apparatus according to a second embodiment.

FIG. 7 is a flowchart of operations by the input apparatus 2 according to the present invention. According to the second embodiment, the input apparatus 2 continuously executes the predetermined operation according to the first embodiment, performed when the predetermined time has passed while the pressure load of the pressing operation by the operator continuously satisfies the predetermined standard, as long as the pressing operation continues. In the flowchart illustrated in FIG. 7, the description assumes, as an application example of the present embodiment, the mobile terminal such as the mobile phone having the touch sensor such as the touch panel that executes the auto repeat function of a character input executed by the contact operation.

According to the present embodiment, when the operation of the input apparatus is initiated, the control unit 15 monitors an input to the touch sensor 11 and a load detected by the load detection unit 12, in the same manner as the first embodiment. At step 31, when it is detected that a contact to the touch sensor 11 by the pressing object (pressing means), such as the finger or the stylus pen, corresponds to the input object displayed on the display unit 14, the control unit 15 proceeds to step S32. According to the present embodiment, the input object is an object of the key and the like, such that the auto repeat function is initiated by the operation holding down the touch sensor.

At step S32, the control unit 15 determines whether the pressure load detected by the load detection unit 12 increases according to the pressure on the touch sensor 11 and satisfies the predetermined standard. Even if the contact to the touch sensor 11 is detected at step S32, the operation according to the present embodiment is not performed unless the pressure load detected by the load detection unit 12 satisfies the predetermined standard.

When the pressure load satisfying the predetermined standard is detected at step S32, the control unit 15 drives the tactile sensation providing unit 13 with the predetermined drive signal such that the touch sensor 11 is vibrated in the predetermined vibration pattern and provides the tactile sensation (step S33). Since this tactile sensation is provided at output of a character, it is preferred to provide the click sensation obtained when the key and the like is pressed down.

After the tactile sensation is provided at step S33, the control unit 15 detects an object corresponding to a position of the contact detected by the touch sensor 11. If the object is for the character input, the control unit 15 outputs a corresponding character (step S34). For example, if the control unit 15 determines that a contact to an object of, for example, a number "2" on the display unit 14 is detected based on position information from the touch sensor 11, the control unit 15 controls the display unit 14 to output and display the number "2" based on the operation holding down the touch sensor.

After the character is output at step S34, the control unit 15 determines whether the predetermine period has passed while the pressure load continuously satisfies the predetermined standard (step S35). According to the present embodiment, the predetermined time is preset to be, for example, one second, which is appropriate as an interval between the first contact and initiation of the auto repeat function. If the predetermined period has not passed at step S35, the control unit 15 determines whether the load detection unit 12 is continuously detecting the pressure load satisfying the predetermined standard (step S36). If the pressure load satisfying the standard load is not detected at step S36, the operation according to the present embodiment ends. On the other hand, if the pressure load continuously satisfying the predetermined standard is detected at step S36, the control unit 15 returns to step S35 and determines whether the predetermined period has passed while the pressure load continuously satisfies the predetermined standard.

On the other hand, when the predetermined period has passed while the pressure load continuously satisfies the standard load at step S35, the control unit 15 controls to provide the tactile sensation (step S37) and to output the character (step S38). The tactile sensation is provided at step S37 in the same manner as step S33, whereas the character is output at step S38 in the same manner as step S34. The tactile sensation provided at step S37 may be either the same as the tactile sensation provided at step S33 or different from it so as to indicate that the auto repeat is executed.

After the character is output at step S38, the control unit 15 determines whether the load detection unit 12 is continuously detecting the pressure load satisfying the predetermined standard load (step S39). If the pressure load satisfying the predetermined standard is not detected at step S39, the operation according to the present embodiment ends.

On the other hand, when the pressure load satisfying the predetermined standard load is continuously detected at step S39, the control unit 15 determines whether a repeat interval (second predetermined period) has passed while the pressure load satisfies the predetermined standard (step S40). The repeat interval is an interval to continually output characters while the auto repeat function is executed. The repeat interval is preset to be 0.2 second, for example, to be shorter than the predetermined period set forth above.

When the repeat interval has not passed at step S40, the control unit 15 returns to step S39 and determines whether the load detection unit 12 is continuously detecting the pressure load satisfying the predetermined standard (step S39). On the other hand, when the repeat interval has passed at step S40, the control unit 15 controls to provide the tactile sensation (step S37) and to output the character (step S38).

After that, the operation described above is repeated as long as the pressure load continuously satisfying the predetermined standard is detected. According to the present embodiment, the control unit 15 controls the tactile sensation providing unit 13 such that the tactile sensation is repeatedly provided to the object pressing the touch face of the touch sensor 11 while the pressure load continuously satisfies the predetermined standard Pth.

Figure 8:
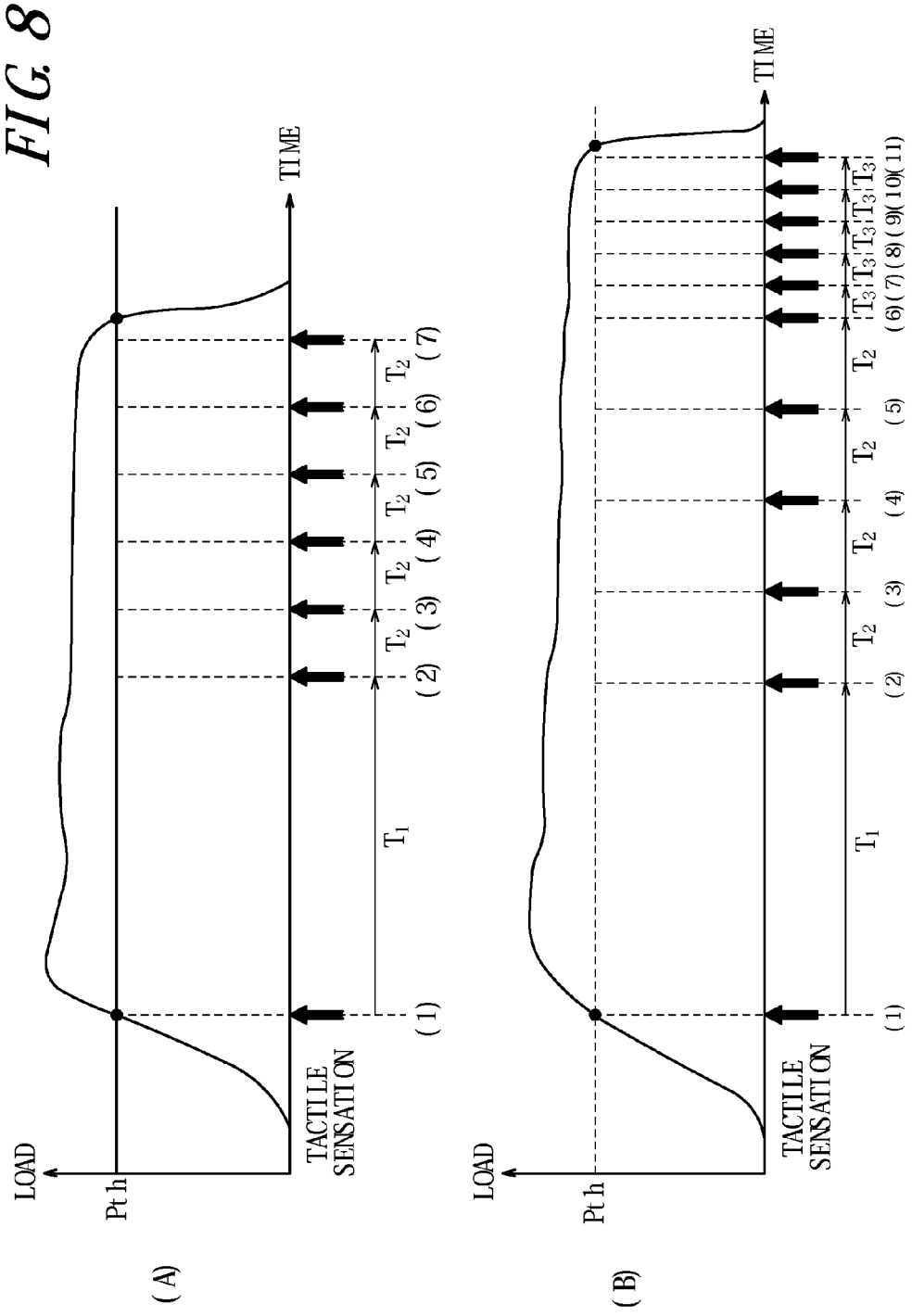
FIG. 8 illustrates graphs of an exemplary chronological change of the pressure load detected by the load detection unit according to the second embodiment.

FIG. 8 illustrates exemplary states when the tactile sensation is provided after the input apparatus 2 according to the present embodiment detects the contact operation. Symbols illustrated in the graphs of FIG. 8 have the same meanings as those described with reference to FIG. 4.

In an example illustrated in FIG. 8(A), the curved line in the graph starts at a point when the touch sensor 11 detects the contact operation and the load detection unit 12 detects the pressure load. As illustrated in FIG. 8(A), the control unit 15 initiates the countdown of the predetermined time T1 at the point when the pressure load detected by the load detection unit 12 increases according to the pressure on the touch sensor 11 and satisfies the predetermined standard Pth. According to the present embodiment, as illustrated in FIG. 8(A), the tactile sensation providing unit 13 provides the tactile sensation at the point (1) when the pressure load satisfies the predetermined standard Pth, in order to indicate that a first character is output. In addition, at the point (1) a character corresponding to the key and the like associated with the contact operation detected is displayed on the display unit 14. That is, if the contact operation is made to the object of the number "2", the number "2" is output in accordance with the operation. Then, the control unit 15 initiates the countdown of the predetermined time T1.

As illustrated in FIG. 8(A), the tactile sensation providing unit 13 provides the tactile sensation at the point (2) when the predetermined time T1 has passed after the point (1) when the pressure load satisfies the predetermined standard Pth, in order to indicate that the character is output again. According to the present embodiment, it is preferable that the tactile sensation provided at the point (2) is the same as that provided at the point (1), as both of the tactile sensations indicate output of a character. However, it is also possible to provide a tactile sensation at the point (2) different from that at the point (1), in order to indicate that the auto repeat function is in execution. At the point (2), in addition, the character corresponding to the key and the like associated with the contact operation detected is displayed on the display unit 14.

Then, the control unit 15 initiates countdown of a repeat interval T2, which is the second predetermined period. As illustrated in FIG. 8(A), the tactile sensation providing unit 13 provides the tactile sensation in order to indicate that the character is once again output at a point (3) when the repeat interval T2 expires after the point (2). At the point (3) also, the character corresponding to the key and the like associated with the contact operation detected is displayed. After that, the tactile sensation providing unit 13 provides the tactile sensation and the display unit 14 displays the character sequentially at each of points (4), (5), (6) and (7), as long as the pressure load satisfies the predetermined standard Pth.

FIG. 8(B) is a diagram illustrating another example of the operation by the input apparatus 2 according to the present embodiment. In the example illustrated in FIG. 8(B), the operation between the point (1) when the touch sensor 11 detects the contact operation and the load detection unit 12 detects the pressure load and the point (2) when the predetermined time T1 has passed is the same as that in FIG. 8(A).

In addition, although the operations at the points (3), (4), (5) and (6) after the repeat interval T2 is the same as those of FIG. 8(A), the control unit 15 then proceeds with countdown of a repeat interval T3, which is a third predetermined time. In the example illustrated in FIG. 8(B), the repeat interval T3 is set to be shorter than the repeat interval T2. After that, the tactile sensation providing unit 13 provides the tactile sensation and the display unit 14 displays character sequentially at each of points (7), (8), (9), (10) and (11) at which the repeat interval T3 expires, as long as the pressure load satisfies the predetermined standard Pth. That is, the example in FIG. 8(B) illustrates that the auto repeat function outputs the character faster in stages. According to the input apparatus 2 of the present embodiment, as described above, it is possible to set such that the operation of the auto repeat function to output the character changes in stages, as necessary. If a speed to output the character by the auto repeat function is changed during the operation as described above, a point to change the speed is appropriately set by using parameters such as the number of outputs of the character, duration to press the key and the like, and the pressure load.

Figure 9:
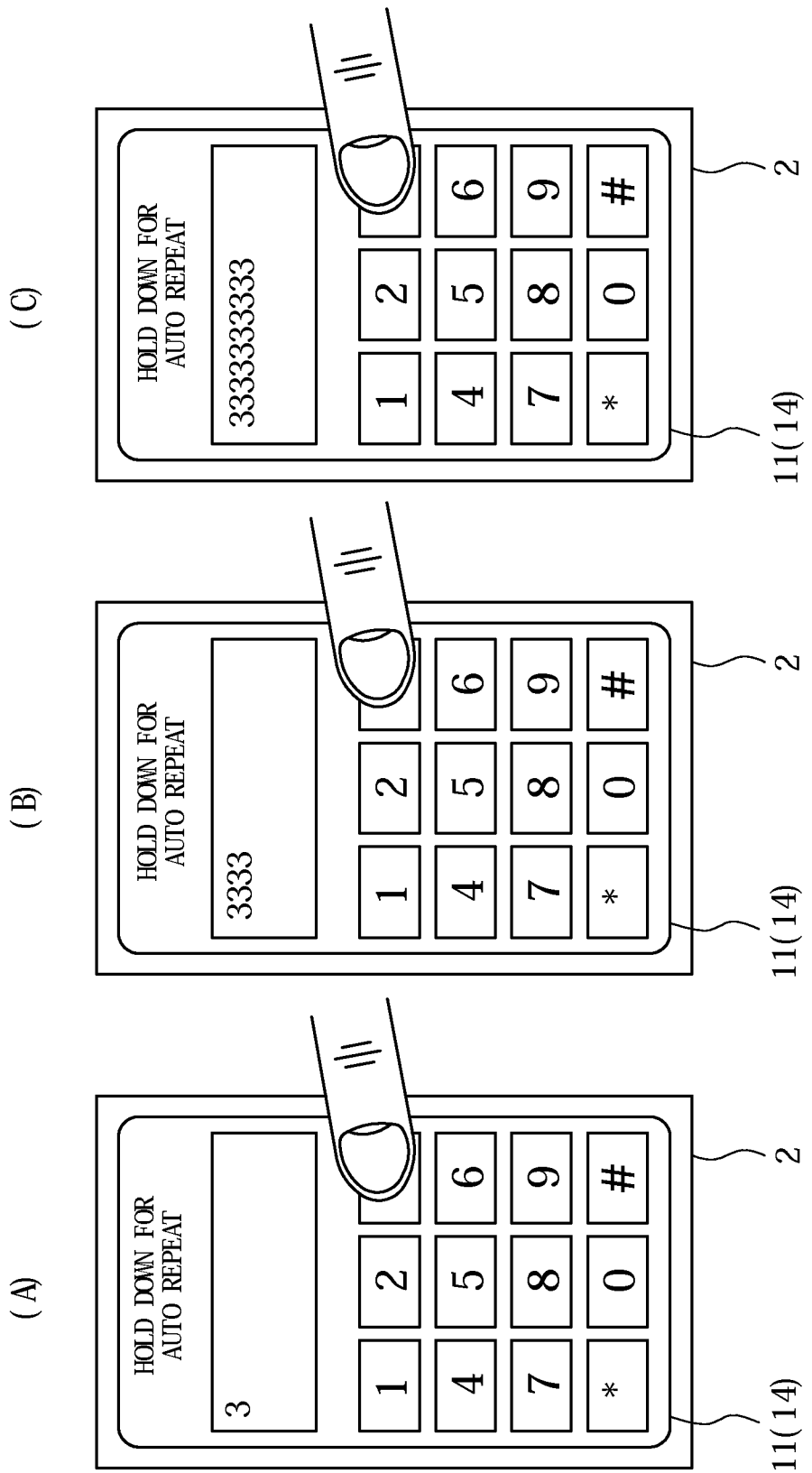
FIG. 9 illustrates an operation of the input apparatus according to the second embodiment.

FIG. 9 illustrates an example of the operation of the auto repeat function by the input apparatus 2 according to the present embodiment.

The input apparatus illustrated in FIG. 9(A) displays the object such as the numerical keypad on the display unit 14 and detects the contact operation to the touch face of the touch sensor 11 by the operator corresponding to a position of the object. The input apparatus 2 detects the contact operation to the numerical keypad by the operator and outputs a number corresponding to each number key. For example, if the operator, using the input apparatus 2, carries out an instant contact operation (a so-called "short pressing") to the touch face of the touch sensor 11 corresponding to a position of a number key "3" displayed on the display unit 14, the number "3" is output once if the load detection satisfies the predetermined standard Pth.

As illustrated in FIG. 9(A), when the operator applies a pressure load satisfying the predetermined standard load to the touch face of the touch sensor 11 corresponding to the position of the number key "3" displayed on the display unit 14, the input apparatus 2 outputs the number "3" once and displays it on the display unit 14. At this time, since the pressure load satisfying the predetermined standard is detected, the input apparatus 2 controls the tactile sensation providing unit 13 to provide the tactile sensation. Thereby, the operator can recognize, through the touch sensor 11 executing the operation, that the character is correctly output.

Then, when the operator applies a pressure load equal to or higher than the predetermined standard to the touch face of the touch sensor 11 for the predetermined time T1 or longer, the input apparatus 2 initiates the auto repeat such that a next number "3" is output and displayed on the display unit 14. At this time, since the pressure load satisfying the predetermined standard load has been detected for the predetermined time T1 or longer, the input apparatus 2 provides the tactile sensation from the tactile sensation providing unit 13. Thereby, the operator can recognize that the auto repeat is initiated and the next character is correctly output.

Subsequently, when the touch face of the touch sensor 11 is pressed by the pressure load equal to or higher than the predetermined standard for the predetermined time T2 or longer, the input unit 2 outputs a next number "3" by the auto repeat continuously executed and displays it on the display unit 14. At this time, since the pressure load satisfying the predetermined standard is detected for the predetermined time T2 or longer, the input apparatus 2 once again provides the tactile sensation by the tactile sensation providing unit 13. Thereby, the operator can recognize that the auto repeat is maintained and the next character is correctly output.

Thereafter, every time the touch face of the touch sensor 11 is pressed by the pressure load equal to or higher than the predetermined standard for the predetermined time T2, the input apparatus 2 continuously outputs a next number "3" and displays it on the display unit 14 and provides the tactile sensation from the tactile sensation providing unit 13. Thereby, the operator can recognize, through the key being pressed, that the character is continuously and correctly output. FIG. 9(B) illustrates a state that, since expiration of the predetermined time T2 is detected for three times in a row after the predetermined time T1 while the pressure load equal to or higher than the predetermined standard Pth is maintained as described above, the input apparatus 2 displays four of the number "3" in total on the display unit 14. Similarly, FIG. 9(C) illustrates a state that, since the expiration of the predetermined time T2 is detected for nine times in a row after the predetermined time T1 while the pressure load equal to or higher than the predetermined standard Pth is maintained, the input apparatus 2 displays ten of the number "3" in total on the display unit 14.

According to the present embodiment, as described above, it is possible to execute the auto repeat function while the load detection unit 12 continuously detects the pressure load satisfying the predetermined standard, and also to provide the tactile sensation to the operator's finger or the like while the auto repeat function is in execution. Accordingly, the operator can recognize, through the touch face, whether the auto repeat function is correctly executed by continuously holding down the touch face corresponding to the key being displayed.

(Third Embodiment)

Next, an input apparatus according to a third embodiment of the present invention will be described. An input apparatus 3 according to the third embodiment may have the same constitution as that of the input apparatus 1 described in the first embodiment and performs the operation according to the second embodiment in a partially altered manner. Hence, the same descriptions as those of the first and second embodiments will be appropriately omitted.

Figure 10:
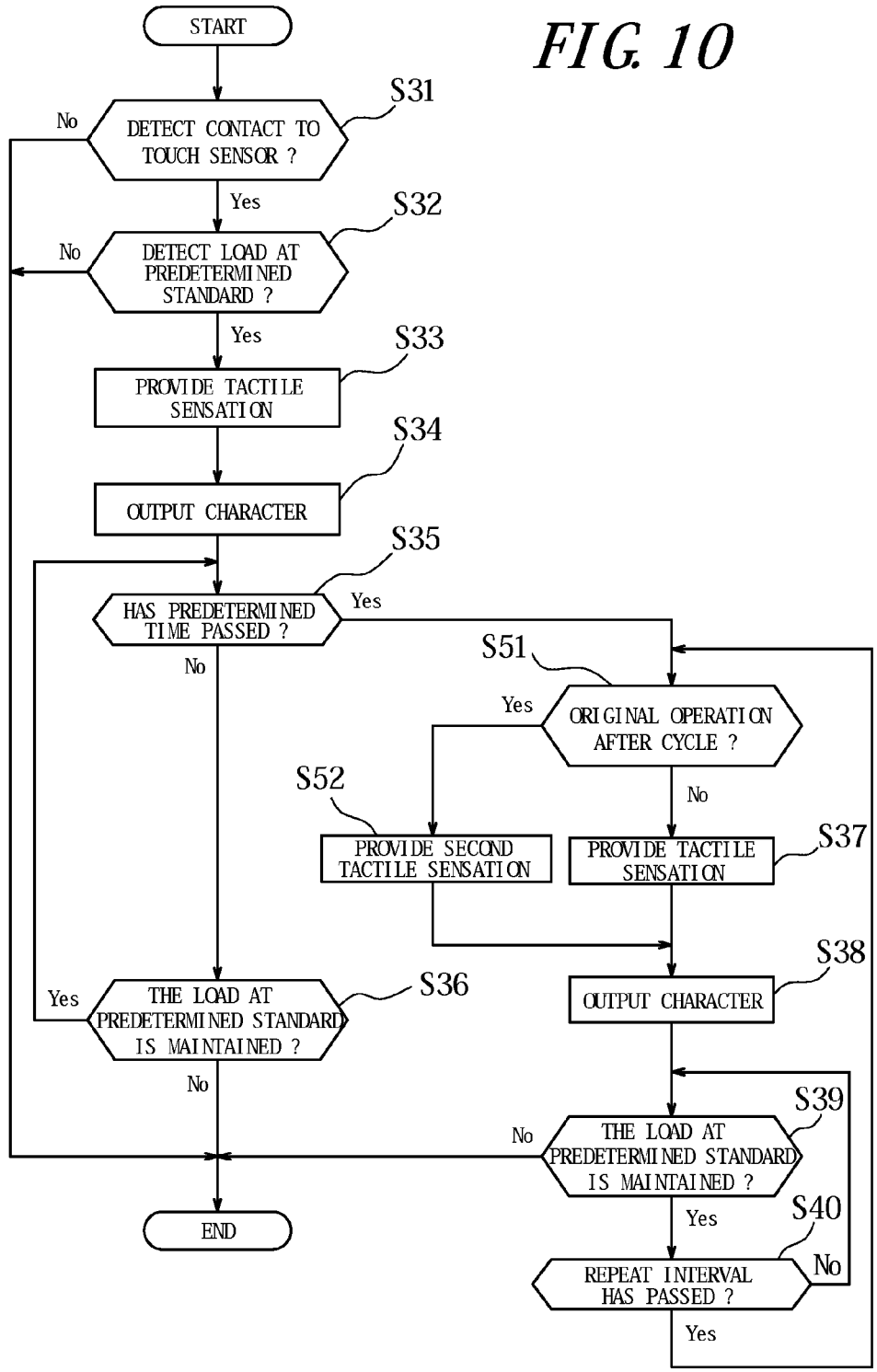
FIG. 10 is a flowchart illustrating operations by the input apparatus according to a third embodiment.

FIG. 10 is a flowchart illustrating an operation by the input apparatus 3 according to the present embodiment. The input apparatus 3 according to the third embodiment, during the operation according to the second embodiment set forth above, provides a tactile sensation different from that of the second embodiment when an original operation is once again executed after one cycle of a cyclic repetitive operation. In a flowchart illustrated in FIG. 10, the description assumes, as an application example of the present embodiment, the mobile terminal such as the mobile phone having the touch sensor such as the touch panel that detects an input operation of a Japanese kana character by multitap as a contact to the touch sensor.

The "multitup" is an input method to detect the pressing operation to keys, such as the number keys of the numerical keypad, to which a plurality of characters such as each row of the Japanese kana characters (for example, "row A (A, I, U, E, O)" and "row Ka (Ka, Ki, Ku, Ke, Ko")" are assigned. According to this input method, when a plurality of continual pressing operations to the same key are detected, a plurality of characters assigned to each key are displayed sequentially according to the number of pressing operations.

That is, for example, when the operator presses the key of the "row A" once, the character "A" is displayed. When the operator presses the key of the "row A" twice, the character "A" is displayed on the display and then replaced with the character "I". When the operator presses the key of the "row A" three times, the character "A" is displayed on the display and then replaced with the character "I", and then with the character "U". In this way, when the operator continually presses the same key multiple times, a next character is displayed in order each time the key is pressed. Although such a multitap input method is referred to as "kana-flipping", "toggle hitting" and the like, it is referred to as the "multitap" in the present application. The multitup input method is applicable to the Japanese "kana" characters described in the present embodiment and also to other characters. For example, it is also possible to replace the Japanese "kana" characters described in the present embodiment with "English capital letters" in order to use characters such as, for example, "A, B, C, D, E" and "F, G H, I, J" in place of the "row A (A, I, U, E, O)" and the "row Ka (Ka, Ki, Ku, Ke, Ko)", respectively.

As illustrated in FIG. 10, the flowchart of the operation of the input apparatus 3 according to the third embodiment is constituted of the flowchart illustrated in FIG. 7 described in the second embodiment, to which step S51 and step S52 following step S51 are added after step S35. Other operations are the same as those of the second embodiment set forth above.

According to the third embodiment, the continuous input by the auto repeat described in the second embodiment is applied to the character input by multitap. Accordingly, when the pressure load satisfying the predetermined standard Pth is detected (step S32), the control unit 15 drives the tactile sensation providing unit 13 with the predetermined drive signal such that the touch sensor 11 is vibrated in the predetermined vibration pattern and provides the tactile sensation (step S33). Since this tactile sensation, similarly to that provided in the second embodiment, indicate output of a character, it is preferable to provide the click sensation as the key depression sensation. As described below, however, it is also possible to provide a tactile sensation different from the click sensation described in the second embodiment.

After the tactile sensation is provided at step S33, the control unit 15 detects an object corresponding to a position of a contact based on the position information from the touch sensor 11. If the object is associated with the character input, the control unit 15 outputs a corresponding character (step S34). According to the present embodiment, the input object is assumed to be an object such as the keys and the like, to which each "row" of the Japanese kana characters is assigned. That is, when the control unit 15 determines based on the position information from the touch sensor 11 that the first contact to the object of the key assigned with, for example, the "row A" on the display unit 14 is detected, the control unit 15 controls the display unit 14 to output and display the first character "A" of the "row A".

When the character is output at step S34, the control unit 15 determines whether the predetermined time T1 has passed while the pressure load satisfies the predetermined standard (step S35). According to the present embodiment, the predetermined time T1 is preset to be, for example, one second such that it is suitable as an interval between the first contact and initiation of a continuous input function of multitap by holding down. When the predetermined time T1 has passed while the pressure load continuously satisfies the standard load at step S35, the control unit 15 determines whether an operation to display a next character corresponds to the original operation after one cycle (step S51). For example, the control unit 15 determines at step S51 whether the next character to be displayed is the first character in each row of the Japanese kana characters. According to the multitap input method, the first character of the "row A", for example, is the character "A", and the characters "A, I, U, E, O" in the "row A" is displayed in order by each pressing operation. After one cycle of these characters (that is, after the character "O"), the character "A" is displayed again as the original operation after the cycle.

At step S51, if the operation to display the next character is not the original operation after the cycle (for example, not the operation to display the character "A" once again), the control unit 15 provides the same tactile sensation as that of the second embodiment (step S37) and outputs a next character (step S38). In this case, operations thereafter are the same as those in the second embodiment and the control unit 15 determines whether the load detection unit 12 is continuously detecting the pressure load satisfying the predetermined standard (step S39). If the pressure load satisfying the predetermined standard is not detected at step S39, the operation according to the present embodiment ends.

In contrast, if the pressure load satisfying the predetermined standard is continuously detected at step S39, the control unit 15 determines whether the repeat interval T2 has expired while the pressure load satisfies the predetermined standard (step S40). According to the present embodiment, the repeat interval is an interval to continually output the characters while continual multitap input by holding down is in execution and set to be, for example, 0.2 second, which is shorter than the predetermined time T1 set forth above. When the repeat interval T2 has not expired at step S40, the control unit 15 returns to step S39 and determines whether the load detection unit 12 is continuously detecting the pressure load satisfying the predetermined standard.

In addition, when the repeat interval T2 expires at step S40, the control unit 15 returns to step S51 and determines whether the operation to display the next character is the original operation after the cycle (that is, the operation to display the kana character "A" again).

If the operation to display the next character is the original operation after the cycle at step S51, the control unit 15 provide a tactile sensation different from that of the second embodiment (step S52) and then proceeds to step S38 to output the next character. That is, when the original operation is once again executed after one cycle of the cyclic repetitive operation while the pressure load continuously satisfies the predetermined standard, the control unit 15 controls the tactile sensation providing unit 13 such that a tactile sensation is provided to the object pressing the touch face of the touch sensor 11. According to the present invention, the "cyclic repetitive operation" is an operation to output characters by the multitap input method. At step S52, the control unit 15 controls to provide a different tactile sensation from the tactile sensation (for example, the click sensation) repetitively provided by the tactile sensation providing unit 13 in the second embodiment. For example, a stronger (or longer) tactile sensation than the click sensation is provided.

Figure 11:
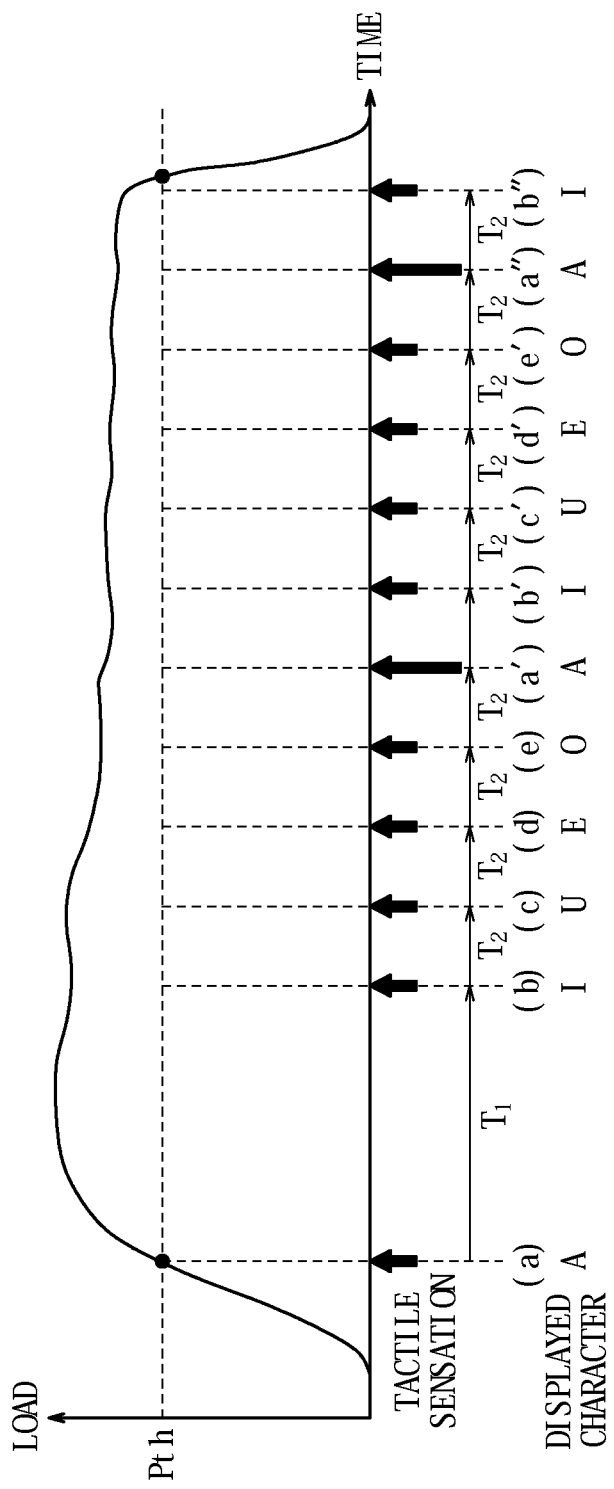
FIG. 11 is a graph illustrating an exemplary chronological change of the pressure load detected by the load detection unit according to the third embodiment.

FIG. 11 is a diagram illustrating a state that the input apparatus 3 according to the present embodiment provides the tactile sensation after detecting the contact operation. Symbols in the graphs illustrated in FIG. 11 have the same meanings as those described with reference to FIG. 4.

In an example illustrated in FIG. 11, the curved line in the graph starts at a point when the touch sensor 11 detects the contact operation and the load detection unit 12 detects the pressure load. As illustrated in FIG. 8(A), the control unit 15 initiates the countdown of the predetermined time T1 at the point (1) when the pressure load detected by the load detection unit 12 increases according to the pressure on the touch sensor 11 and satisfies the predetermined standard Pth. According to the present invention also, at a point (a) when the pressure load satisfies the predetermined standard Pth as illustrated in FIG. 11, the tactile sensation providing unit 13 provides the tactile sensation, in order to indicate that the first character is displayed. At the point (a), in addition, a character corresponding to the key and the like associated with the contact operation detected is displayed on the display unit 14. That is, if the contact operation is made to the object of the key of the "row A", for example, the first character "A" is output. Then, the control unit 15 continues to time until the predetermined time T1 passes.

As illustrated in FIG. 11, at a point (b) when the predetermined time T1 has passed after the point (a) when the pressure load satisfies the predetermined standard Pth, the tactile sensation providing unit 13 provides the tactile sensation, in order to indicate that the next character is displayed. According to the present embodiment as well, it is preferable that the tactile sensation provided at the point (b) is the same as that provided at the point (a), as both tactile sensations indicate that the character is displayed. In addition, at the point (b), the character corresponding to the key and the like associated with the contact operation detected is displayed on the display unit 14. As illustrated in FIG. 11, when the character displayed at the point (a) is the Japanese kana character "A", the next kana character "I" is displayed replacing the character "A" at the point (b).

Then, the control unit 15 continues to time until the repeat interval T2 expires. As illustrated in FIG. 11, at a point (c) when the repeat interval T2 expires after the point (b), the tactile sensation providing unit 13 provides the tactile sensation, in order to indicate that a further next character is displayed. In addition, at the point (c) also, the character corresponding to the key and the like associated with the contact operation detected is output. If the character displayed at the point (b) is "I", the next character "U" is displayed replacing the character "I" at the point (c). Thereafter, as long as the pressure load satisfies the predetermined standard Pth, the tactile sensation providing unit 13 provides the tactile sensation at the points (d), (e), (a'), (b'), . . . and each of the characters "E", "O", "A", "I" is displayed on the display unit 14 in order at each of the points.

At the point (a'), the operation to display the character is the original operation of the "row A" after one cycle (operation to display the character "A"). That is, the character to be displayed next is the first character of each row of the Japanese kana characters. In such a case, the control unit 15 provides a tactile sensation different from that of the second embodiment (step S52). That is, when the original operation is executed again after one cycle of the cyclic repetitive operation, the control unit 15 controls the tactile sensation providing unit 13 such that a tactile sensation, different from the tactile sensation repetitively provided in the second embodiment, is provided to the object pressing the touch face of the touch sensor 11.

In FIG. 11, for example, as illustrated by the upward pointing arrow at the position (a'), the tactile sensation providing unit 13 can vibrate the touch face of the touch sensor 11 stronger (or longer) than vibrations at the points (e) and (b') before and after the point (a'). Similarly, at a point (a"), the tactile sensation providing unit 13 can vibrate the touch face of the touch sensor 11 stronger (or longer) than vibrations at points (e') and (b") before and after the point (a"). In an example illustrated in FIG. 11, a state is described that the operator carefully times and reduces the pressure load and removes the finger or the like away from the touch face of the touch sensor 11 at the point (b") when the character "I" is displayed in the third cycle.

According to the present invention, as described above, it is possible to continuously display the character in order by the multitap input method while the load detection unit 12 continuously detects the pressure load satisfying the predetermined standard. According to the present invention, in addition, each time when the character displayed on the display unit 14 is changed during execution of the multitap function, the tactile sensation is provided to the operator's finger or the like. Accordingly, by continuing to hold down the touch face corresponding to the key displayed, the operator can recognize, through the touch face, that a multitap character input function is correctly executed and the character displayed on the display unit 14 keeps changing.

According to the present embodiment, moreover, when the first Japanese kana character is displayed after one cycle of the characters in each "row" by the multitap character input function, a tactile sensation, different from the tactile sensation provided when the characters before and after the first character are displayed, is provided. Thereby, the operator can recognize, through the touch face, that the first character is displayed again after one cycle of the kana characters in each "row".

It is to be understood that the present invention is not limited to the above embodiments but may be modified or varied in a multiple of manners. For example, although there is no mention about whether to generate a sound when the input apparatus performs the operation in each of the above embodiments, it is also possible to appropriately generate a sound in conjunction with the operation in addition to the input operation in each of the above embodiments. Thereby, operability of the input apparatus is further improved and generation of erroneous inputs is reduced.

In addition, the load detection unit in each of the above embodiments may be constituted by using any number of strain gauge sensors. Moreover, the load detection unit may be constituted according to a contact detection scheme of the touch sensor. For example, the load detection unit can be constituted without using the strain gauge sensor if the load can be detected from a change of an output signal based on a resistance change relative to a contact area in using the resistive film type. Alternatively, the load detection unit can be constituted without using the strain gauge sensor if the load can be detected from a change in an output signal based on a change in capacitance in using the capacitive type.

In addition, the tactile sensation providing unit may be constituted by using any number of piezoelectric transducers, transparent piezoelectric elements provided on an entire operation surface of the touch panel or, if it is possible to vibrate such that the tactile sensation is provided, an eccentric motor which rotates 360 degrees in 1 cycle of the drive signal. Moreover, the load detection unit and the tactile sensation providing unit can share the piezoelectric elements if both units are constituted by using the piezoelectric elements.

According to the input apparatus of the present invention, the tactile sensation providing unit is driven when the pressure load detected by the load detection unit satisfies the standard to provide the tactile sensation. This "when the pressure load detected by the load detection unit satisfies the standard" may represent "when the pressure load detected by the load detection unit reaches a standard value to provide the tactile sensation", "when the pressure load detected by the load detection unit exceeds the standard value to provide the tactile sensation", or "when the standard value to provide the tactile sensation is detected by the load detection unit".

REFERENCE SIGNS LIST 11 touch sensor
11a touch face
12 load detection unit
13 tactile sensation providing unit
14 display unit
15 control unit
21 housing
21 liquid crystal display panel
22 insulator
23 upper cover
24 insulator
31 strain gauge sensor
32 piezoelectric vibrator

The invention claimed is:

1. An input apparatus comprising:
   a touch sensor configured to detect a contact;
   a load detector configured to detect a pressure load on a touch face of the touch sensor;
   a tactile sensation provider configured to vibrate the touch face; and
   a controller configured to control drive of the tactile sensation provider, when the load detector detects a pressure load exceeding a predetermined pressure threshold until a predetermined time threshold, such that a tactile sensation is provided to an object pressing the touch face,
   wherein the controller controls the tactile sensation provider, while the pressure load exceeding the predetermined pressure threshold is continuously detected after the predetermined time threshold, such that the tactile sensation is repeatedly provided at a first time interval between a tactile sensation and a next tactile sensation, the first time interval being different from a time interval until the predetermined time threshold, and
   wherein the controller controls the tactile sensation provider, while the pressure load exceeding the predetermined pressure threshold is continuously detected after the tactile sensation is repeatedly provided at the first time interval, such that the tactile sensation is repeatedly provided at a second time interval between a tactile sensation and a next tactile sensation, the second time interval being different from the first time interval.

2. An input apparatus comprising:
   a touch sensor configured to detect a contact;
   a load detector configured to detect a pressure load on a touch face of the touch sensor;
   a tactile sensation provider configured to vibrate the touch face; and
   a controller configured to control drive of the tactile sensation provider, when the load detector detects a pressure load exceeding a predetermined pressure threshold until a predetermined time threshold, such that a first tactile sensation is provided to an object pressing the touch face and a first object of a plurality of objects corresponding to a first cycle of a cyclic repetitive operation associated with the detection of the contact on the touch sensor is displayed on a display unit,
   wherein the controller controls the tactile sensation provider, when an original operation is executed after one cycle of the cyclic repetitive operation while the pressure load exceeding the predetermined pressure threshold is continuously detected after the predetermined time threshold, such that a second tactile sensation different from the first tactile sensation is provided to the object pressing the touch face, and the first object of the plurality of objects corresponding to a second cycle of the cyclic repetitive operation associated with the detection of the contact on the touch sensor is displayed on the display unit.

* * * * *